3,259,392
SEAL BETWEEN TWO RELATIVELY ROTATING PARTS FOR SEALING FLUID UNDER PRESSURE
Vasalie L. Peickii, Hillsborough, Dan A. Christensen, Woodside, and John H. Bradfute, Santa Clara, Calif., assignors to Federal-Mogul Corporation, a corporation of Michigan
Continuation of application Ser. No. 188,217, Apr. 17, 1962. This application Mar. 22, 1965, Ser. No. 444,921
8 Claims. (Cl. 277—59)

This application is a continuation of application Serial Number 188,217, filed April 17, 1962, now abandoned.

This invention relates to a device for sealing fluids under pressure to prevent their leakage from between two relatively rotating concentric members.

In torque converters, fluid transmissions, and many other environments, it is necessary to seal against leakage of a liquid or gas from between two relatively rotating concentric members. The problem becomes difficult because the liquid or gas is under pressure, which tends to force the fluid out, and also because of the extremely small area that is commonly available for installation of a sealing device. Heretofore, split piston-type metal seal rings have generally been used in the high pressure hydraulic circuits of these devices, because these split metal rings are small in cross-section and can be installed where other types of sealing devices would not fit, and because they are able to withstand high surface speeds at relatively high pressures.

However, the split piston-type rings also have long had serious disadvantages. Their leak rates are very high, often around ½ gallon per minute, principally due to the fact that the fluid can leak through them at their split. Therefore, they have required large pumps and have wasted horsepower just to maintain the necessary supply of fluid. The leakage increases as the outer periphery of the seal wears, primarily because such wear results in an increase in the width of the gap at the split. All such seals do at times rotate in the bore, whether they are intended to or not, and this is one cause of the wear of the outer periphery; in addition, the shaft groove is often somewhat eccentric with respect to the center line of the shaft causing the ring to work back and forth and also contributing to wear and therefore to eventual leakage beyond that which can be tolerated. Moreover, such rings have a tendency to slip and to wear grooves in the bore, often requiring a refinishing or replacement of the bore member. In extreme cases such wear causes severe problems of disassembly.

Another disadvantage of such piston rings is the fact that they require a smoothly finished bore usually requiring a finish of around 20 R.M.S. The rings, being metal, do not themselves compensate for any out-of-roundness of the bore, a condition which often occurs in service due to the stress relief caused by temperature cycling. Furthermore, cast iron rings, and such rings are usually made from cast iron, are brittle and thus are often difficult to install without breaking.

The split rings, however, have continued to be used because no one has found a way of solving the problem of installation of a better ring in a groove on a shaft, or how to provide means for taking up wear or overcoming the various tolerance problems.

To illustrate the problem a test was run on a split piston-type seal ring of cast iron with a special metal coating used in the 6-inch bore of a heavy duty transmission of a large tractor manufacturer's products. For the test, the transmission was run at a shaft speed of 1660 r.p.m., the temperature of the oil to be sealed was between 180 and 200° F., and the oil was under a pressure of 250 p.s.i. Before the test run the seal leaked at the rate of four gallons per hour. During the test the leakage gradually increased, and after the 200 hour test the seal leaked at the rate of two gallons per minte and was badly worn. The test conditions were not exceptional or over-severe, and the results agree with the experience of many people in the field.

The present invention solves the problem of providing a simple sealing ring which can be installed in places having the same space requirements as those where the split piston rings have been used, but the seal of this invention is much less expensive, has a longer life, and has a much lower leak rate. The invention prevents the leakage in large part because it employs an unsplit ring which, according to the principles of this invention, is made of a suitable elastomer. No modification of the adjacent parts is required, but the disadvantage common to split rings is eliminated and the wear problem is also solved to a great extent because the elastomeric ring has been found to wear at a substantially lower rate than the metal piston rings, and furthermore, has little or no wear effect on the member against which it seals.

Other objects and advantages of the invention will appear from the following description of a preferred form thereof.

Figure 1:
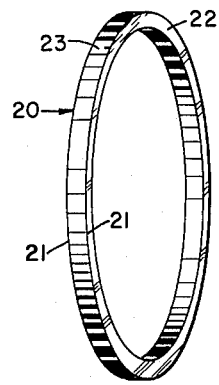
FIG. 1 is a view in perspective of a sealing member embodying the principles of the invention.
Figure 2:
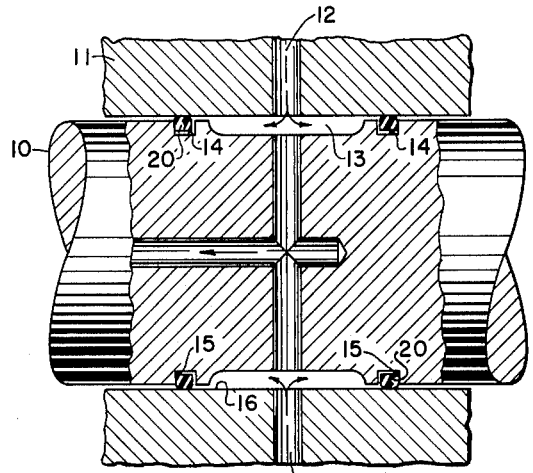
FIG. 2 is a fragmentary enlarged view in elevation and in section of a portion of an installation incorporating the ring of FIG. 1.
Figure 3:
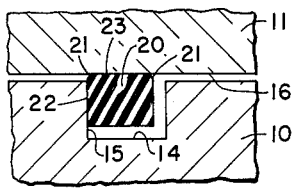
FIG. 3 is a still further enlarged fragmentary view in elevation and in section of a portion of the installation of FIG. 2.

The installation drawing of FIG. 2 shows two relatively rotating concentric members 10 and 11, the member 10 being an inner member which can be considered as a shaft, and the member 11 being an outer member which can be considered as a stationary bore. An oil inlet 12 leads into a clearance space 13. It is desired to retain the oil or other fluid in the space 13 under pressure typically in the range of 50 to 500 p.s.i., and to do so with a minimum amount of leakage. The spaces for two sealing rings are so provided by a pair of grooves 14 in the shaft 10, providing an axially outer radial wall 15 at each end of the chamber 13 against which the sealing rings 20 seal. The bore 16 itself may be generally cylindrical, and at any rate has a cylindrical wall opposite the grooves 14. These grooves 14 are fairly narrow, and metal piston rings would have to be split in order to go into them.

The present invention, however, employs an elastomeric ring 20 which is a continuous annulus and which is made of a suitable elastomeric material. It is generally rectangular in cross-section with rounded edges 21, providing a radial end face 22 that seals against the radial wall 15, and a cylindrical portion 23 that seals against the cylindrical wall 16. Since the ring 20 is continuous, it necessarily has to be sufficiently stretchable and elastic to be able to be installed by stretching it around the shaft 10 and it has to have sufficient elastic properties to then snap back into a position smaller than the shaft so that it will be locked in the groove 14 and so that it will seal against the radial wall 15. Its shore durometer should preferably be in the range of between 50 and 100 with about a 50% extension modulus preferably for rings used in this environment except where they are very large in diameter. Actually, rings of this type have been run at speeds up to 2600 feet per minute, and at pressures up to 1500 p.s.i. with a typical run being at 600 r.p.m. and 300 p.s.i. at a temperature of around 200° F. Necessarily the elastomer has to be one that is resistant to the fluid being sealed. Elastomers having these properties are well known and there are many types of them.

The ring 20 also has sufficient rigidity so that it will not twist or warp once installed and retains its radial wall 22 in contact with the radial wall 15 of the groove under the force of the fluid pressure sought to be sealed. Also, its outer wall 23 seals with pressure against a bore wall 16 so that there is little if any rotation relative to the bore. Thus, the rotating surface is primarily at the face between the two radial walls 15 and 22. Where desired, this can be changed to have the seal at the outer periphery, but this is less desirable generally. At the time of installation the seal 20 may be somewhat loose in the groove 14, but the fluid pressure soon forces it against the sealing face and the size and shape of the annulus holds it against the bore member. The force of the fluid serves to insure contact at the sealing wall at all times.

Tests have been made which have shown that the results of this seal are quite satisfactory and that there is both less wear and less leakage than with typical piston-type rings of the split-type construction. A 200 hour test at 815 r.p.m. of a 2.8125 inch bore, with transmission oil at 180° to 210° F. and 300 p.s.i. showed leakage of less than ½ gallon per day per seal, which is considered to be very low for this apparatus.

The elastomeric ring 20 enables the use of less closely finished bores; 150 R.M.S. is satisfactory for a static seal.

The substantially rectangular form is preferable for ease of handling and because it is the most stable form in the application. It has the required flat face for the groove side 15, and the cylindrical face required for the bore 16. It gives the lowest unit face pressure for a projected pressure area of a seal section, and for the same groove dimensions, speed, and pressure it runs cooler. Whether the radial face 22 should be smaller than the cylindrical face 23 depends on the application desired, but it is often desirable to have the face 23 stationary in the bore 16 or at least not rotate very much.

The ring 20 should be elastic enough for installation without damage, and the tensile strength should be high enough to prevent extrusion and to prevent handling damage. Its flexibility should enable it to deform sufficiently under pressure to form a good static seal and a good dynamic seal and accommodate out-of-roundness of itself and the surfaces 15 and 16. It should respond to pressure to lock on the selected surface. Note also that the groove may be in the bore instead of in the shaft.

The ring 20 needs enough strength to resist shearing, both circumferentially and axially, and to withstand rather rough or careless handling. The thermal coefficient of expansion of the ring 20 should be low enough to prevent plastic flow at operating temperatures due to ring expansion.

In addition to being substantially unaffected by sealed fluids (usually lubricating oils) and the normal contaminants encountered, the ring 20 should not be degraded substantially when held a the operating temperature during operation; it should also not lose its physical properties at temperature extremes liable to be encountered; for example, it should not became brittle at low temperatures or too weak at high temperatures. It should be phase-stable over the operating temperature range; for example, no such severe dimensional change as the normalizing encountered in nylon should take place.

The coefficient of friction of the ring 20 should be low enough to prevent overheating consistent with its other properties, as well as those of the oil. The ring 20 should have sufficient wear resistance to give an acceptable life in a given installation.

Among the materials that do *not* meet these requirements are unfilled Teflon, which extrudes, and unfilled nylon, which shrinks as it normalizes. A blend of butadiene-acrylonitrile copolymer with phenolic resins and uncompounded phenol formaldehyde two-stage resins; plus filters of carbon black or graphite, gives good results, the resins comprising between 5% and 50% of the formulation. There are other good elastomers too, including formulation containing Viton, though pure Viton tends toward excessive wear.

To those skilled in the art to which this invention relates, many additional changes in construction and widely differing embodiments of the invention will suggest themselves without departing from the spirit and scope of the invention as defined in the claims.

What is claimed is:

1. In a fluid transmission and the like operating at high speeds in the order of 600 to 2600 feet per minute and cooled by oil under pressure in the order of 250 p.s.i., the combination of:
   a cylindrical shaft member and a member having a cylindrical bore, said members rotating relatively to each other at said high speeds, said shaft member having at least one annular groove that has a radial wall at one end;
   a seal comprising a continuous annulus of oil-resistant synthetic rubber substantially rectangular in cross-section along a radial plane and having a radial end face and a cylindrical radially outer face and having sufficient stretch and elasticity to be moved axially along said shaft member and snapped into said groove where it engages only said radial wall, engaging it with said radial end face, and engages said bore with said cylindrical outer face, one of said faces being engaged non-rotatably with the said member it engages, the other said face being rotatably engaged with the said member it engages; and
   oil exerting said pressure against said seal, said oil holding the said radial face in contact with said radial wall to prevent leaking of said oil and constituting the sole means doing so.

2. The combination of claim 1 wherein the axial width exceeds the radial width of the cross-section.

3. The combination of claim 1 wherein the radial width of the cross-section exceeds the axial width of the seal.

4. In a fluid transmission and the like having a cylindrical shaft member and a member providing a cylindrical bore, said members rotating relatively to each other during operation at high speeds in the order of 600 to 2600 feet per minute and cooled by oil under pressure in the order of 250 p.s.i., the shaft having at least one annular groove that has a radial wall at one end, the combination of:
   a seal comprising a continuous annulus of oil-resistant synthetic rubber having a flat radial end face and a cylindrical radially outer face and having sufficient stretch and elasticity to be moved axially along said shaft and snapped into said groove where it engages only said radial wall, engaging it with said radial end face, and engages said bore with said cylindrical outer face, one of said faces being engaged non-rotatably with the said member it engages, the other said face being rotatably engaged with the said member it engages, said oil holding the said radial face in contact with said radial wall to prevent leaking of said oil and constituting the sole means doing so, said synthetic rubber being flexible enough to form a good static seal and a good dynamic seal under said pressure and having a thermal coefficient of expansion low enough to prevent plastic flow at operating temperatures developed in said annulus and a coefficient of friction low enough to prevent overheating in operation.

5. The combination of claim 4 wherein said seal is substantially rectangular in cross-section along a radial plane.

6. The combination of claim 5 wherein the axial width of the seal exceeds the radial width of the cross-section.

7. The combination of claim 5 wherein the radial width of the cross-section exceeds the axial width of the seal.

8. A fluid transmission or the like having:
   a first member having a generally cylindrical bore;

a second member having a generally cylindrical shaft in said bore and adapted for continuous rapid rotation therein at a rate in the order of 600 to 2600 feet per minute and more and having two spaced-apart annular grooves each with a radial wall at an outer end;

a seal in each said groove and axially narrower than said groove and comprising a continuous synthetic rubber ring generally rectangular in cross-section and having sufficient stretch and elasticity to be placed around said shaft and move axially into said groove where it contracts and engages only said radial wall of said second member, with a radial end face and engages said cylindrical bore of said second member with a cylindrical face, one of said faces being engaged non-rotatably with the said member it engages, the other said face being rotatably engaged with the said member it engages;

lubricating and cooling oil between said shaft and said bore in between said radial walls; and means exerting pressure in the order of 250 p.s.i. on said oil and against said seals to hold their radial faces in contact with said radial walls and their cylindrical faces in contact with the bore, thereby preventing leakage out from between said shaft and said bore.

References Cited by the Examiner

UNITED STATES PATENTS 3,100,648   8/1963   Lee et al. _____ 277—59

FOREIGN PATENTS 667,784   3/1952   Great Britain.

LAVERNE D. GEIGER, *Primary Examiner.*

J. MEDNICK, *Examiner.*